United States Patent Office 3,014,070
Patented Dec. 19, 1961

---

3,014,070
DIBASIC ACID TREATING PROCESS
Harry Chafetz, Poughkeepsie, N.Y., assignor to Texaco Inc., a corporation of Delaware
No Drawing. Filed Dec. 24, 1957, Ser. No. 704,889
10 Claims. (Cl. 260—537)

The instant invention relates to removal of succinic anhydride, and succinic acid from a mixture containing at least one of these materials mixed with a higher molecular weight dibasic acid of the oxalic acid series.

Dibasic acids of this homologous series are succinic, glutaric, adipic, pimelic, suberic, azelaic, sebacic, and higher ones of the formula $(CH_2)_n(COOH)_2$. Esters of these acids are useful as plasticizers, synthetic lubricants and the like. They are useful in mixtures or as individual compounds. Adipic, used in the manufacture of nylon 66, is particularly commercially important. Separation of these acids generally enhances their value.

Most processes producing dibasic acids usually make a complex crude mixture containing, in addition to a fairly wide spectrum of the above-mentioned dibasic acids, a variety of contaminants such as monobasic acids, particularly $C_{1-10}$ monobasic acids, and associated contaminants having noncarboxylic oxygen. These contaminants are generally objectionable because they give the crude a bad odor and a dark color, and they can be difficult to remove cheaply by conventional methods. Typical kinds of such associated oxygenated contaminants are alcohols, ketones, lactones, nitrated hydrocarbons, tars, aldo acids, keto acids, esters, hydroxy acids.

A crude mixture of succinic, glutaric, and adipic acids and some of the higher dibasic acids of the oxalic acid series can be made in a number of ways, for example, by oxidation of paraffinic and/or isoparaffinic hydrocarbons, e.g., refined wax, semi-refined wax, petrolatum, lubricating oil, slack wax, scale wax, foot oil and the like with air, hydrogen peroxide, nitric acid, chromic acid, ozone, or a mixture or a succession of these oxidizing agents. Preferably such crude mixture is made by two-stage process wherein a macrocrystalline paraffin wax is oxidized with air, usually in the presence of a metalliferous oxidation catalyst such as a manganese salt, until the saponification number of the mixture reaches at least 200 and, advantageously 300 and 600; thereafter the air oxidate is agitated intensively with nitric acid at a temperature between 180° and 450° F. for at least about one minute.

In such preferred dibasic acid preparation an aqueous phase containing practically all the dibasic acids separates by gravity from an oily phase after the nitric acid oxidation step. Weight proportions of specific dibasic acids in this aqueous layer are approximately as follows: 20 to 35% succinic ($C_4$); 15 to 25% glutaric ($C_5$); 15 to 25% adipic ($C_6$); 5 to 15% pimelic ($C_7$); and 5 to 25% suberic ($C_8$) and higher. Substantially all the water and nitric acid can be removed from this aqueous layer containing the dibasic acids by distillation, preferably at reduced pressure of less than 300 mm. Hg absolute. This also removes lower molecular weight monobasic acids and leaves a dark colored residue (frequently oily at room temperature) of crude dibasic acids contaminated principally with materials having noncarboxylic oxygen.

In the practice of my invention it is advantageous to remove metal ions which could otherwise be retained in and contaminate certain dibasic acid products. One way to remove metal ions is to treat an aqueous solution of the dibasic acid material for subsequent processing with a cation exchange resin such as sulfonated coal, or a sulfonated copolymer of styrene and polyvinylbenzene or the like, e.g., Amberlite IR–120 made by the Rohm and Haas Company or Dowex 50 made by the Dow Chemical Company.

Alternatively, the hydrocarbon can be oxidized in a single stage operation with air to a very high acid value, e.g., 300–600 Neut. No., then the dibasic acid values extracted with water or an aqueous mineral acid such as sulfuric acid or hydrochloric acid (after being subjected to acid hydrolysis to break up esters, if desired) or a lower ($C_1-C_4$) alkanol, and the extract solution stripped of solvent to yield a similar mixture of crude dibasic acids.

Crude dibasic acids can also be extracted from reaction mixtures by neutralization and saponification of the mixture with caustic soda, followed by removal of the resulting sodium salts of acids in aqueous solution. The acids can then be "sprung" from the salts by treatment thereof with mineral acid such as sulfuric acid or the like.

Other ways of making similar crude mixtures containing succinic and higher dibasic acids of the oxalic acid series are: oxidation of levulinic acid with molecular oxygen in the presence of metalliferous oxidation catalyst; oxidation of hydroxy acids such as hydroxy stearic acid or glycerides thereof with nitric acid; oxidation of unsaturated fatty acids such as oleic acid, cotton seed fatty acid, or linseed fatty acid or their corresponding glycerides with nitric acid; oxidation of Fischer-Tropsch and oxo products, e.g., with nitric acid; and nitric acid oxidation of cycloparaffins such as cyclopentane, cycloalkanols such as cyclohexanol, and cycloketones such as cyclohexanone.

Broadly my process comprises separating succinic anhydride from a mixture thereof with at least one dibasic acid of the oxalic acid series having molecular weight above glutaric, that is, adipic and higher acids of the formula $HOOC(CH_2)_mCOOH$ where $m$ is an integer of 6 to 10 inclusively, by lixiviating the mixture with a chlorinated methane having 1–3 chlorine atoms.

A more restricted aspect of my invention is that of starting with a mixture containing succinic acid instead of all or part of the succinic anhydride in the starting mixture and converting said succinic acid into the anhydride by forming a distilland of the starting mixture and an inert, water-immiscible, liquid phase water-entraining agent, and maintaining distillation of said entraining agent and water from said distilland at a distilland temperature of about 175° C. to about 220° C. until evolution of water from said distilland substantially ceases.

The water-entraining agent for operation at atmospheric pressure must have a boiling point in the range of 175–220° C. However, lower boiling entraining agents can also be used providing that sufficient pressure is maintained in the distilling operation to maintain distilland temperature at 175–220° C. In any case the water-entraining agent is an inert, hydrophobic organic liquid capable of dissolving succinic acid to form a solution of at least about 5 grams of that acid per 100 grams of said agent at temperature in the range of 175° to 220° C. Additionally, it should not dissolve substantially more than about one gram of water per 100 grams of solvent at room temperature and pressure, e.g., at atmospheric pressure and 70° C.

Inertness of the water-entraining agent is an important consideration in the practice of my invention. Such agent should not be an amine or an alcohol (which would react with the dibasic acid mixture) or an ester (which could lead to transesterification). Of the high boiling agents, those having aromatic nuclear structure appear to be specially suitable for the general practice of my process. The most suitable and so preferred specific inert water-entraining agents for the practice of my process are halohydrocarbons, such as one or a mixture of chlorobenzenes, chlorotoluenes, chloroethylbenzenes, and chloroethyltoluenes; ethers such as cresyl methyl ethers, cresyl ethyl ethers, and cresyl benzyl ethers; and hydrocarbons such as one or a mixture of diethylbenzenes, butylbenzene, amylbenzene, and tetralin. Other types of water-entraining agents which are satisfactory are monobasic acids, e.g., valeric acid, diethylacetic acid, caproic acid (although their odor makes them less desirable than the foregoing agents). I can also use aliphatic or aromatic nitriles such as benzonitrile, caprylic acid nitrile, tolunitriles. Aliphatic and aromatic nitrohydrocarbons are also suitable, e.g., nitrobenzene, nitropentane, and the like. Distilling with distilland temperature substantially below about 175° C. is not sufficient to produce succinic anhydride at any appreciable rate. Use of distilland temperature substantially above 220° C. tends to give degradation products and/or decarboxylation of dibasic acids present.

Suitable lower boiling water-entraining agents useful in the practice of my process under superatmospheric pressure to attain the desired temperature range are one or more halohydrocarbons such as chloroform, dichloromethane, dichloroethane, dichloropropane, chlorobutane, and dichlorobutane; one or more hydrocarbons such as benzene, toluene, xylene, ethylbenzene, and cumene; and ethers and chloroethers such as propyl ether, β-chloroethyl ether, butyl ether, anisole, and ethyl propyl ether. The water insolubility of the entraining agent permits one to condense the distillate, separate water from the condensate practically completely, e.g., by gravity settling, and reflux the entraining agent to the distilland for eventual exhaustion of free water therein.

In my process it is important to take overhead the water and the entraining agent to the substantial exclusion of succinic anhydride and succinic acid. This can be done very simply by rectifying the distillate very slightly in atmospheric pressure operation, ordinary wall effects of a long vapor tube being adequate in the normal instance, but packing etc., and reflux also permissible in a column. Using a low-boiling water-entraining agent such as benzene under superatmospheric pressure is also suitable for removing water without rectification but yet substantially exclusively to any succinic anhydride and succinic acid because the mol fraction of succinic anhydride and succinic acid in the vapor phase is very minute under elevated pressure.

The mixture of succinic acid and higher dibasic acids of the oxalic acid series is mixed with the water-entraining agent, usually in a ratio of about 1 to 7 parts of water-entraining agent by weight per part of liquid mixed dibasic acids, but higher and lower proportions can be used, if desired, the minimum proportion being that necessary to protect the distilland from local overheating during the distillation. Use of a proportion of water-entraining agent substantially above about 7 adds to the cost of the process without significant advantage. Using a mixture of crude dibasic acids from the preferred source, i.e., that from the air and nitric acid oxidation of paraffinic hydrocarbon, I prefer to use about 2 to 5 parts by weight of water-entraining agent per part of crude mixed acids. Undissolved components will remain in the distilland under these conditions, but they are innocuous in my process. Should they tend to give uneven boiling and some bumping, these conditions can be alleviated by use of mechanical agitation of the distilland. Such agitation also assists in preventing local overheating.

Simple cooling of the remaining distilland, after the water-entraining distillation, to about room temperature or below, e.g., to a temperature from minus 20 to plus 100° F. and preferably about 60° F., is convenient for recovery of the solid phase mass of succinic anhydride and the associated solids by crystallization. Higher and lower temperature, of course, can be used providing that the water-entraining agent remains liquid. When very impure dibasic acids have been used for the distillation, a dark, sometimes gummy and sometimes oily material insoluble in the water-entraining agent frequently forms. This material, which contains most of the mineral matter originally present in the dibasic acids, can be separated from the distilland by either filtration or decantation at a temperature slightly below the boiling point of the water-entraining agent.

Frequently it is advantageous to strip away a little of the water-entraining liquid for concentrating the distillation residue containing the dibasic acids. This can be done by conventional distillation, vacuum distillation, and/or a stripping distillation with an entraining permanent gas such as nitrogen. In such case temperature of the concentrated distilland should not be permitted to go above about 220° C. to guard against substantial decarboxylation or other degradation of the dibasic acids in the stripped residue. Additionally, particularly when operating on crude dibasic acids from the preferred source, correlation of solvent proportion and crystallizing temperature concentration to about 40% solids and cooling to about 120° F., can be used to effect partially selective crystallization, i.e., a type of fractional crystallization, e.g., of a predominantly succinic anhydride crystal crop containing a comparatively small proportion of higher molecular weight dibasic acids.

Alternatively, such concentration can be extended, particularly when using a low-boiling water-entraining agent such as benzene, chloroform, or toluene, and the higher molecular weight dibasic acids can be the result of distilling off and/or evaporating the water-entraining agent practically entirely to leave a residue of the solids for lixiviation.

The solid phase mass of succinic anhydride and higher molecular weight dibasic acids is readily separated from the cooled distillation residue by filtration, settling, centrifuging or the like. The crystalline solids can be washed with a light hydrocarbon solvent such as mixed hexanes, petroleum ether, or the like to remove traces of water-entraining agent mother liquor preparatory to the solvent lixiviation, then dried, if desired. In some instances it is advantageous to operate a concentrating distillation on the first filtrate for recovery of a further crop of mixed crystalline dibasic acids and associated substances. Such crystal cropping operation can be repeated one or more times.

Thus, in the first stage of this embodiment of my invention wherein the starting material contains succinic acid I can use a high boiling water-entraining agent and operate at or near atmospheric pressure, recover a solid phase mass for further purification, and lixiviate this mass with the chlorinated methane, preferably at atmospheric pressure generally using 1 to 20 parts and preferably 1 to 4 parts of chlorinated methane per part of succinic anhydride present in the recovered solid phase mass for lixiviating step of my process; I use about the same proportion when the starting material contains succinic anhydride from any source. Temperature of the lixiviating operation can be broadly minus 30° C. or even lower to as high as 150° C. (provided however that the chlorinated methane remains liquid) with pressure being used if necessary to maintain the lixiviating agent in the liquid phase. Preferably the lixiviating is done at about 40 to 70° C. for efficiency and economy in the practice of my invention and it is done with methylene chloride or chloroform at atmospheric pressure to the exclusion of methyl chloride.

In one aspect of my invention the water-entraining agent and the lixiviating agent are the same. The distilland, after dehydrating the succinic acid, can be separated into liquid and solid phases at a temperature of about 150° F. down to about 0° F. and the lixiviation can be minimized because the mother liquor retains succinic anhydride in such instance.

The suitable lixiviating solvents are the chlorinated methanes, that is, methyl chloride, methylene chloride, and chloroform. Of these the polychlorinated methanes, especially methylene chloride and chloroform, are the preferred ones because they remain in liquid phase at ordinary temperature, yet have a sufficiently low normal boiling point to be removed from the dibasic acids and succinic anhydride by simple evaporation, drying, distillation, or stripping with an inert gas. While pressure can be used in the lixiviation step, e.g., to maintain the particular chloromethane or chloromethane mixture in liquid phase at a temperature of −30° C. to +150° C., lixiviation at atmospheric pressure using a temperature at about the boiling point of the polychlorinated methane is preferred for efficiency and economy in the practice of my invention.

While individually the dibasic acids succinic and glutaric, and succinic anhydride do not show substantial solubility in methylene chloride and carbon tetrachloride, and succinic anhydride shows only a limited solubility in chloroform, it will be seen from the examples, below, that succinic anhydride and/or glutaric acid mixed in a composition with a higher dibasic acid such as adipic acid behaves quite atypically and unpredictably as to solubility in these solvents.

Suitable materials of construction for my process are corrosion-resistant, e.g., glass, glass-lined steel, stainless steel, and porcelain.

The following examples show ways in which my invention has been practiced but should not be construed as limiting the invention. All parts indicated are parts by weight, and all percentages are weight percentages unless otherwise noted.

*Example 1.*—The following table shows solubilities of succinic anhydride alone and various homologous dibasic acids alone, the solubilities measured in grams of solute per hundred grams of the lixiviating agents at the boiling point of these agents.

| Agent | Succinic Anhydride | Succinic Acid | Glutaric Acid | Adipic Acid |
|---|---|---|---|---|
| Methylene Chloride | 6.6 | Insoluble | Less than 0.4. | Insoluble. |
| Chloroform | 3.7 | ---do------- | More than 17. | Do. |
| Carbon Tetrachloride | Less than 0.3. | ---do------- | Less than 0.2. | Do. |

*Example 2.*—A mixture of 5 grams of succinic anhydride and 5 grams of adipic acid was extracted with 30 ml. of chloroform refluxing at atmospheric pressure. A second extraction was made of the residue from the first extraction using 15 ml. of chloroform also refluxing at atmospheric pressure. The chloroform-soluble fraction contained almost pure succinic anhydride, and the insoluble residue from the two extractions contained 60 weight percent adipic acid. Further extractions with chloroform can be used to remove a larger proportion of the succinic anhydride originally in the mixture, and greater ratios of chloroform to acid-anhydride mixture can be used with the same effect.

*Example 3.*—A mixture of 5 grams of succinic anhydride and 5 grams of adipic acid was twice extracted, each time with a 40 ml. portion of methylene chloride refluxing at atmospheric pressure. The insoluble fraction was adipic acid of about 97% purity, showing the very sharp separation of succinic anhydride from adipic acid with this lixiviating agent.

*Example 4.*—A mixture of 5 grams of succinic anhydride, 5 grams of glutaric acid, and 5 grams of adipic acid was extracted twice, each time with a 40 ml. portion of chloroform refluxing at atmosphere pressure. The chloroform-insoluble fraction was almost pure adipic acid.

*Example 5.*—Some unusual solubility effects were observed in the following experiments. In the first experiment a mixture of equal weights of glutaric and adipic acids was found to be soluble to the extent of 4.5 grams per 100 grams of methylene chloride at its atmospheric boiling point. Note that, from the table in Example 1, both of these acids are substantially insoluble individually in methylene chloride under the same conditions.

A mixture of equal weights of succinic acid, glutaric acid and adipic acid was found to be soluble to the extent of 3.4 grams per hundred grams of methylene chloride refluxing at its boiling point, whereas the table in Example 1 shows that these three materials are substantially insoluble in said solvent individually under the same conditions. In a further experiment a mixture of succinic and glutaric acids was soluble only to the extent of about 0.9 gram per hundred grams of methylene chloride refluxing at its atmospheric boiling point.

In a still further experiment a mixture containing equal weights of succinic anhydride, glutaric acid, and adipic acid was found to be soluble to the extent of 16 grams per 100 grams of carbon tetrachloride refluxing at its atmospheric boiling point. The table in Example 1 shows none of these materials having substantial solubility alone in carbon tetrachloride under the same conditions. The solution was cooled to precipitate adipic acid and succinic anhydride, and to retain a solvent phase containing preponderantly glutaric acid. This shows the lixiviation of a solid phase mass of the starting mixture with carbon tetrachloride would be effective to remove only the glutaric acid substantially selectively from the adipic acid and succinic anhydride present.

*Example 6.*—A mixture of 25 grams of succinic acid, 25 grams of adipic acid, and 182 ml. of orthodichlorobenzene was distilled in the manner described in Example 8. A total of 60 ml. of distillate was collected, the distillate temperature range being 71–183° C. while the distilland temperature range was 187–195° C. A total of 3.4 ml. of water (89% of the theoretical amount to be given off by conversion of 25 grams of succinic acid to its anhydride) was separated off the distillate and collected as discrete liquid water from this distillate. The distilland was cooled to about 20° C. and filtered of 44.4 grams (after air-drying) of white crystalline solids.

These solids can be lixiviated with chloroform in the manner of Example 2 or with methylene chloride in the manner of Example 3 for separating the resulting succinic anhydride from the adipic acid therein.

*Example 7.*—A mixture of 25 grams of succinic acid, 20 grams of glutaric acid, 20 grams of adipic acid, and 200 ml. of orthodichlorobenzene was subjected to distillation in a manner described in Example 8 except that a column packed with glass helices was used instead of a concentric tube fractionating column. A total of 25 ml. of distillate was collected over a distillate temperature range of 97–176° C., the distilland temperature range being 178–180° C. in this period. The distilland was cooled to about 25° C. and filtered to yield 57.4 grams of white, crystalline solids.

These solids can be lixiviated with chloroform in the manner of Example 2 or with methylene chloride in the manner of Example 3 for separating the resulting succinic anhydride from the adipic acid therein.

*Example 8.*—The mixture of crude dibasic acids used here was prepared by the further oxidation of air-oxidized wax (having a saponification No. of 504 and oxidized in the presence of a manganese catalyst) with 8.02 parts of 10.6% nitric acid per part of air-oxidized wax oxidate using a temperature of 305–355° F. The aqueous phase of the reaction product was stripped of water, nitric acid, and other low boiling components at a pressure below 300 mm. Hg absolute to leave a brownish, somewhat oily, crystalline residue. This residue of very crude dibasic acids was dissolved in water and the solution passed through a column of the hydrogen form of Amberlite IR–120 cation exchange resin to remove impurities. A mixture of crude, yellowish crystalline dibasic acids was recovered from the ion-exchanged effluent by stripping said effluent at atmospheric pressure to a temperature of about 195° F. This mixture analyzed: 33% succinic acid, 19% glutaric acid, 15% adipic acid, 9% pimelic acid, 11% suberic and higher homologous dibasic acids, and 13% impurities. It had neutralization No. of 770.

A portion of 50 grams of these recovered, crude, ion-exchanged acids was mixed with 200 ml. of orthodichlorobenzene, and the mixture subjected to distillation in a flask fitted with a thermometer well and connected to an efficient fractionating column, condenser, and receiver. Fractional distillation was conducted using a 2 to 1 reflux ratio. A total of 75 ml. of distillate was collected, the distillate temperature range being 77 to 166° C. and the distilland temperature range being 180–183° C. This treatment was effective for distilling off water and converting the preponderance of the succinic acid into succinic anhydride in the distilland. The resulting distilland was then cooled to about 0° C. and filtered to yield 31.1 grams of brownish, crystalline solids.

These solids can be extracted with a chloromethane in the manner of Examples 2 and 3, above, to remove succinic anhydride therein.

*Example 9.*—The following operation illustrates the use of a low boiling water-entraining agent for converting succinic acid into succinic anhydride according to the precepts of my process. A mixture of 1000 ml. of benzene and 100 grams of succinic acid was maintained at total reflux under autogenous pressure in a stainless steel autoclave equipped with a vapor line, a reflux condenser, and a separator for water removal from the condensate. Distilland temperature was 350–400° F., and the distillation was run for about 1½ hours. The distilland, after cooling to room temperature, was filtered of solids which had a neutralization No. of 1028, this indicating that about 49% conversion of the succinic acid to succinic anhydride was accomplished under the foregoing conditions. By continuing such dehydration with the same or a higher boiling water-entraining agent substantially all the water of succinic acid dehydration to its anhydride can be released.

This kind of dehydration can, of course, be applied also to acid mixtures such as those shown in Example 7, then followed by precipitation from the cooled, resulting distilland and lixiviation of the resulting precipitated solids with a chlorinated methane in the manner of either Example 2 or Example 3 to remove the succinic anhydride.

I claim:
1. A process for separating succinic anhydride from a mixture thereof with at least one normally crystalline dibasic acid of the formula $HOOC(CH_2)_mCOOH$ where $m$ is an integer from 6 to 10 inclusively which comprises lixiviating said mixture with a chlorinated methane selected from the group consisting of methyl chloride, methylene chloride and chloroform.

2. The process of claim 1 wherein said succinic anhydride is made by forming a distilland of a mixture which contains succinic acid and said dibasic acid and an inert, water-immiscible, liquid phase water-entraining agent, said agent being capable of dissolving at least about 5 grams of succinic acid per 100 grams of the agent at a temperature in the range of 175°–220° C.; maintaining distillation of said entraining agent and water from said distilland at a distilland temperature of about 175° C. to about 220° C. until evolution of water from said distilland substantially ceases; recovering from the resulting distillation residue a solid phase mass of succinic anhydride and said dibasic acid; and lixiviating the recovered solid phase mass with the chlorinated methane.

3. The process of claim 2 wherein the dibasic acid mixture is the product of oxidizing paraffinic hydrocarbon; the water-entraining agent is selected from the group consisting of halohydrocarbons, hydrocarbons, nitriles, nitrohydrocarbons, monobasic carboxylic acids, and ethers; the proportion of water-entraining agent to said dibasic acid mixture is between about 1:1 and about 7:1 and the distillation residue is cooled to a temperature between about −20° F. to about +100° F. for recovery of said solid phase mass.

4. The process of claim 2 wherein the water-entraining agent is chlorobenzene, the pressure is about atmospheric in said distillation.

5. The process of claim 2 wherein the water-entraining agent is an alkyl benzene, and the pressure is about atmospheric for said distillation.

6. The process of claim 2 wherein the water-entraining agent is benzene, and the pressure is superatmospheric in said distillation.

7. The process of claim 1 wherein said lixiviation with said chlorinated methane is conducted with 1 to 20 parts of said chlorinated methane per part of said dibasic acid mixture using a temperature of −30° to +150° C.

8. The process of claim 7 wherein said lixiviation is done with chloroform.

9. The process of claim 7 wherein said lixiviation is done with methylene chloride.

10. A method of separating succinic acid from a mixture thereof with at least one normally crystalline dibasic acid of the formula $HOOC(CH_2)_mCOOH$ where $m$ is an integer from 6 to 10 inclusively, comprising converting said succinic acid into succinic anhydride by forming a distilland of a mixture which contains said succinic acid, said dibasic acid and an inert water-immiscible, liquid phase water-entraining agent, said agent being capable of dissolving at least about 5 grams of succinic acid per 100 grams of said agent at a temperature in the range of 175–220° C., maintaining distillation of said entraining agent and water from said distilland at a distilland temperature of about 175° C. to about 220° C. until evolution of water from said distilland substantially ceases, the proportion of said water-entraining agent to said mixture being between about 1:1 and about 7:1, cooling the distillation residue to a temperature between about −20° F. to about +100° F. for recovery of said mixture as a solid phase mass, and lixiviating said recovered solid phase mass with a chlorinated methane selected from the group consisting of methyl chloride, methylene chloride, and chloroform thereby separating said succinic anhydride from said dibasic acid, said lixiviation conducted with 1 to 20 parts of said chlorinated methane per part of said mixture using a temperature of −30° to +150° C.

References Cited in the file of this patent
UNITED STATES PATENTS

| | | |
|---|---|---|
| 2,365,290 | Price et al. | Dec. 19, 1944 |
| 2,683,110 | Rousseau | July 6, 1954 |
| 2,716,133 | Pooler | Aug. 23, 1955 |
| 2,729,600 | Beach | Jan. 3, 1956 |
| 2,794,831 | McKinnis | June 4, 1957 |

OTHER REFERENCES

Bouveault: Bull. Soc. Chim., Paris (3), 19, 562–565 (1898).

Huntress et al.: "Identification of Pure Organic Compounds," 1941, page 145.

Noller: "Chemistry of Organic Compounds," 1951, pages 731 to 734.

Weissberger: Technique of Organic Chemistry, vol. III, part I, second edition, 1956, pages 215–226.